(12) United States Patent
Groot et al.

(10) Patent No.: US 6,775,006 B2
(45) Date of Patent: Aug. 10, 2004

(54) HEIGHT SCANNING INTERFEROMETRY METHOD AND APPARATUS INCLUDING PHASE GAP ANALYSIS

(75) Inventors: Peter De Groot, Middleton, CT (US); James W. Kramer, Waterford, CT (US)

(73) Assignee: Zygo Corporation, Middlefield, CT (US)

( * ) Notice: Subject to any disclaimer, the term of this patent is extended or adjusted under 35 U.S.C. 154(b) by 218 days.

(21) Appl. No.: 10/053,106

(22) Filed: Nov. 2, 2001

(65) Prior Publication Data

US 2002/0135775 A1 Sep. 26, 2002

Related U.S. Application Data

(60) Provisional application No. 60/245,443, filed on Nov. 2, 2000.

(51) Int. Cl.[7] .............................................. G01B 9/02
(52) U.S. Cl. ...................................... 356/497; 356/511
(58) Field of Search ................................ 356/450, 479, 356/496, 511, 516, 497

(56) References Cited

U.S. PATENT DOCUMENTS

| | | | |
|---|---|---|---|
| 5,398,113 A | 3/1995 | De Groot | 356/360 |
| 5,402,234 A | 3/1995 | Deck | 356/497 |
| 5,438,413 A | 8/1995 | Mazor et al. | |
| 5,471,303 A | 11/1995 | Ai et al. | 356/497 |
| 5,784,164 A | 7/1998 | Deck et al. | 356/511 |
| 6,195,168 B1 | 2/2001 | De Lega et al. | 356/497 |
| 6,597,460 B2 * | 7/2003 | Groot et al. | 356/512 |
| 2001/0050773 A1 * | 12/2001 | De Groot et al. | 356/497 |
| 2002/0149781 A1 * | 10/2002 | Harasaki et al. | 356/497 |

OTHER PUBLICATIONS

P. de Groot and Leslie Deck, "Surface profiling by analysis of white–light interferograms in the spatial frequency domain," J. Mod. Opt. 42(2), 389–401 (1995).

T. Dresel, G. Hausler and H. Venzke, "Three–dimensional sensing of rough surfaces by coherence radar," Appl. Opt. 31(7), 919–925 (1992).

Gordon S. Kino and Stanley S. C. Chim, "Mirau correlation microscope," Appl. Opt. 29(26), 3775–3783 (1990).

Kieran G. Larkin, "Efficient nonlinear algorithm for envelope detection in white light interferometry," J. Opt. Soc. Am. A 4, 832–843 (1996).

M.–C. Park and S.–W. Kim, "Direct quadratic polynominal fitting for fringe peak detection of white light scanning interferograms", Opt. Eng. 39(4) 952–959 (2000).

A. Harasaki, J. Schmit and J.C. Wyant, "Improved vertical–scanning interferometry", Appl. Opt. 13(39), 2107–2115 (2000).

B.L. Danielson and C.Y. Boisrobert, "Absolute optical ranging using low coherence interferometry," Appl. Opt. 30(21), 2975–2979 (1991).

A. Haraski and J.C. Wyant, "Fringe modulation skewing effect in white–light vertical scanning interferometry," Appl. Opt. 39(13), 2101–2106 (2000).

D. C. Ghiglia and M. C. Pritt, "Two–dimensional phase unwrapping: Theory, algorithms and software" (John Wiley & Sons, Inc., New York, 1998), p. 93.

(List continued on next page.)

*Primary Examiner*—Frank G. Font
*Assistant Examiner*—Andrew H. Lee
(74) *Attorney, Agent, or Firm*—Fish & Richardson P.C.

(57) ABSTRACT

An analysis method for analyzing height-scanning interferometry data from a test surface, the method including: calculating a coherence profile and a phase profile for the test surface based on the data; calculating an experimental phase gap map based on a difference between the phase profile and the coherence profile; filtering the experimental phase gap map to remove noise; and using the filtered phase gap map to improve an estimate for a height profile of the test surface.

42 Claims, 8 Drawing Sheets-

OTHER PUBLICATIONS

J. Schwider and L. Zhou, "Dispersive interferometric profilometer," Opt. Lett. 19(13), 995–997 (1994).

S.W. Kim and G.H. Kim, "Thickness–profile measurement of transparent thin–film layers by white–light scanning interferometry." Appl. Opt. 38(28) (1999).

M. Davidson, K. Kaufman, and I. Mazor, "The coherence probe microscope," Solid State Technology, 30(9) 57–59 (1987).

J.C. Wyant, "How to extend interferometry for rough–surface tests," Laser Focus World, 131–135 (Sep. 1993).

P. de Groot and L. Deck, "Three–dimensional imaging by sub–Nyquist sampling of white–light interferograms," Opt. Lett. 18(17), 1462–1464 (1993).

P. Sandoz, R. Devillers, and A. Plata, "Unambiguous profilometry by fringe–order identification in white–light phase shifting interferometry," J. Mod. Opt. 44, 519–534 (1997).

P.J. Caber, S.J. Martinek, and R.J. Niemann, "A new interferometric profiler for smooth and rough surfaces," SPIE 2088, 195–203 (1993).

A. Pfortner and J. Schwider, "Dispersion error in white–light Linnik interferometers and its implications for evaluation procedures," Appl. Opt. 40(34) 6223–6228 (2001).

P. de Groot, X. Colonna de Lega, J. Kramer, and M. Turzhitsky, "High precision surface inspection on the microscale by broadband interferometry", Proc. Fringe 2001, The $4^{th}$ International Workshop on Automatic Porcessing of Fringe Patterns, Wolfgang Osten and Werner Juptner Eds., Elsevier, pp. 333–340 (2001).

L. Deck and P. de Groot, "High–speed non–contact profiler based on scanning white light interferometry," Appl. Opt. 33(31), 7334–7338 (Nov. 1, 1994).

* cited by examiner

| Step | Procedure |
|------|-----------|
| 210 | Acquire intensity vs. position data during an optical-path length scan of the interferometer |
| 220 | Transform into the frequency domain and use a least-squares fit to phase vs. wavenumber to generate experimental coherence and phase data. |
| 230 | Approximate the phase gap with a low-noise substitute, generated e.g. by field averaging. |
| 240 | Connect the approximate phase gap to remove $2\text{-}\pi$ wrapping between pixels |
| 250 | Calculate a field-corrected phase free of pixel-to-pixel fringe order errors, by combining phase and coherence information |
| 260 | Calculate an absolute phase incorporating all known phase and dispersion offsets. |
| 270 | Calculate a final high-resolution height profile from the absolute phase. |

Figure 1     200

| 200 | Symbol | Procedure Step | Reference |
|---|---|---|---|
| 210 a | $I_{ex}(\zeta, x)$ | Experimental intensity vs. scan position data | Figure 4 |
| 220 a | $\phi_{ex}(k, x)$ | Experimental phase vs. wavenumber data | Eq. (3) |
| b | $a_{ex}(k, x)$ | Phase slope (by linear fit) | Eq. (4) |
| c | $b^*_{ex}(k, x)$ | Phase intercept (by linear fit) | Eq. (5) |
| d | $\Theta_{ex}(x)$ | Phase-equivalent coherence profile | Eq. (6) |
| e | $\theta^*_{ex}(x)$ | Wrapped experimental phase profile at $k_0$ | Eq. (7) |
| 230 a | $\Theta_{sm}(x)$ | Smoothed coherence profile | Eq. (32) |
| b | $\Gamma^*(x)$ | Approximate phase gap | Eq. (33) |
| c | $\langle \Gamma' \rangle$ | Global average phase gap | Eq. (27) |
| d | $\Gamma''_{sm}(x)$ | Filtered phase gap | Eq. (29) |
| e | $V(x)$ | Phase gap variance | Eq. (35) |
| f | $V_{sm}(x)$ | Smoothed phase gap variance | Eq. (36) |
| g | $\Gamma^*_{blend}(x)$ | Wrapped blended phase gap | Eq. (37) |
| 240 a | $\Gamma'(x)$ | Connected phase gap | Eq. (18) |
| b | $\Gamma'_{fit}(x)$ | Surface fit to the connected phase gap | Eq. (34) |
| c | $\Gamma'_{blend}(x)$ | Blended connected phase gap | Eq. (38) |
| 250 a | $M(x)$ | Field dependence of fringe order | Eq. (20) |
| b | $\theta'_{ex}(x)$ | Field-corrected phase profile | Eq. (21) |
| 260 a | $M_0$ | Absolute fringe order | Eq. (24) |
| b | $\theta_{ex}(x)$ | Absolute phase profile | Eq. (25) |
| 270 a | $h_{ex}(x)$ | Absolute height profile | Eq. (26) |

Figure 2

HEIGHT SCANNING INTERFEROMETRY METHOD AND APPARATUS INCLUDING PHASE GAP ANALYSIS

CROSS-REFERENCE TO RELATED APPLICATIONS

This application claims priority from U.S. provisional patent application No. 60/245,443, filed Nov. 2, 2000, the contents of which is incorporated herein by reference.

BACKGROUND

Height-scanning interferometry (HSI) employs broadband light sources to determine 3-D surface height profiles. HSI generates high-resolution profiles by combining two different pieces of information extracted from broadband interference patterns: coherence data and phase data. A low-resolution coherence height profile is derived from the localization of the interference effect, and a phase profile is calculated, e.g., from the interference phase itself, usually near the position of maximum interference signal strength (peak fringe contrast). By combining these two pieces of information, one can measure a high-resolution phase height profile of the surface without the fringe-order ambiguity normally associated with laser-based interferometry.

Fundamental to the success of high-resolution HSI is agreement between the data derived from coherence and phase information. Unfortunately, this is not always easily achieved. Optical distortions that vary with field position and object slope can deform the measured coherence and phase profiles in different ways, resulting in a mismatch that spoils prior-art techniques for determining fringe order in the phase profile. For example, a spherical object can contain erroneous changes in fringe order near the edges attributable in part to chromatic aberrations in the optics that distort the coherence profile. These and similar difficulties related to the mismatch between coherence and phase data can limit the range of application of high-resolution HSI.

SUMMARY

In general, in one aspect, the invention features an analysis method for analyzing height-scanning interferometry data from a test surface. The method includes: calculating a coherence profile and a phase profile for the test surface based on the data; calculating an experimental phase gap map based on a difference between the phase profile and the coherence profile; filtering the experimental phase gap map to remove noise; and using the filtered phase gap map to determine a height profile of the test surface.

Embodiments of the method may include any of the following features.

The data may include an intensity signal $I(\zeta,x)$ produced by interfering a measurement wavefront reflected from the test surface with a reference wavefront reflected from a reference surface, where the wavefronts are derived from a common source, $\zeta$ is a scan position for the reference surface, and x is a field position corresponding to an object position on the test surface. The coherence profile may be calculated from a localization of interference fringes in the intensity signal with respect to the scan position $\zeta$. Alternatively, the coherence profile may be calculated from a wavevector dependence of a phase $\phi$ of a transform (e.g., a Fourier transform) of $I(\zeta,x)$ with respect to the scan position $\zeta$. The phase profile is may calculated from an interferometric phase of $I(\zeta,x)$ at a nominal wavevector $k_0$. For example, the phase profile may be calculated from a phase of a transform (e.g., a Fourier transform) of $I(\zeta,x)$ with respect to the scan position $\zeta$ at a nominal wavevector $k_0$.

The experimental phase gap map may be calculated by expressing the coherence profile and the phase profile in common units. For example, the coherence profile may be expressed in radians with respect to a nominal wavevector $k_0$ according to $\Theta(x)=k_0 h_C(x)$, where $h_C(x)$ is a surface height profile of the test surface derived from the coherence profile, and wherein the phase profile is calculated as the interferometric phase $\theta(x)$ in radians of the height scanning interferometry data at the nominal wavevector $k_0$. In this case, the experimental phase gap map $G_{ex}(x)$ may be expressed as $\theta(x)-\Theta(x)$. A difference between the experimental phase gap map $G_{ex}(x)$ and a theoretical phase gap map $G(x)=\gamma(x)-k_0\tau(x)$ can be indicative of agreement between the coherence profile of the test surface and the phase profile of the test surface, wherein $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector. The method may further including determining values for $\gamma(x)$ and $\tau(x)$.

Calculating the experimental phase gap map may include smoothing the coherence profile to round edges in the coherence profile, and calculating the experimental phase gap map based on a difference between the phase profile and the smoothed coherence profile.

Filtering the experimental phase gap map may include calculating a global average of the experimental phase gap map. For example, calculating the global average may include calculating at least one trigonometric function (e.g., a sine and a cosine) for each of multiple points of the experimental phase gap map, averaging the results of each trigonometric function, and calculating an inverse trigonometric function based on each trigonometric average (e.g., arctan 2) to determine the global average of the experimental phase gap map.

In addition, filtering the experimental phase gap map may include calculating at least one trigonometric function for each of multiple points of the experimental phase gap map, smoothing the results of each trigonometric function over the multiple points, and calculating an inverse trigonometric function of the smoothed results to determine the filtered phase gap map. For example, calculating the at least one trigonometric function for the multiple points may include calculating a sine map and a cosine map based on the experimental phase gap map, and wherein the inverse trigonometric function is based on an arctan 2 function. Smoothing the results of each trigonometric functions may include using a convolution function or averaging the results among nearby points.

Furthermore, filtering the experimental phase gap map may includes smoothing the coherence profile to round edges in the coherence profile, and determining the filtered phase gap map based on a difference between the phase profile and the smoothed coherence profile.

Moreover, filtering the experimental phase gap may include a combinations of techniques, such as those described above. For example, filtering the experimental phase gap map may include calculating a variance map of the experimental phase gap, filtering the experimental phase gap map with each of multiple algorithms, and calculating the filtered phase gap map based on a locally weighted average of the algorithm outputs, wherein the local weights are based on the variance map. The variance map may include calculating at least one trigonometric function (e.g., sine and cosine) for each of multiple points of the experimental phase gap map, smoothing the results of each trigonometric function over the multiple points, and determining the variance map based on the smoothed trigonometric functions.

Using the filtered phase gap map may include connecting the filtered phase gap map to remove $2\pi$ phase steps. Furthermore, using the filtered phase gap map may include fitting the connected filtered phase gap map to a polynomial function and using the polynomial function to improve an estimate for a height profile of the test surface.

Using the filtered phase gap map may further include determining a relative fringe order profile by determining a multiple of $2\pi$ nearest to a difference between the experimental phase gap map and the connected filtered phase gap map. For example, using the filtered phase gap map further includes determining a relative height profile of the test surface based on the phase profile and the relative fringe order.

Moreover, using the filtered phase gap map may further include determining an absolute fringe order based on the experimental phase gap map, the connected filtered phase gap map, and a theoretical phase gap map $G(x)=\gamma(x)-k_0\tau(x)$, where the phase profile is calculated with respect to a nominal wavevector $k_0$, $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector. In this case, the method may further include determining values for $\gamma(x)$ and $\tau(x)$. Moreover, using the filtered phase gap map may further include determining an absolute height profile of the test surface based on the phase profile and the absolute fringe order.

In general, in another aspect, the invention features an interferometric analysis method including: providing a coherence profile and a phase profile derived from height-scanning interferometry data for a test surface; calculating a filtered phase gap map based on a difference between the phase profile and the coherence profile; and using the filtered phase gap map to determine a height profile of the test surface. Calculating the filtered phase gap map may include smoothing the coherence profile to round edges in the coherence profile, and calculating the filtered phase gap map based on a difference between the phase profile and the smoothed coherence profile. Furthermore, the method may include any of the features described further above in connection with the first inventive method.

In general, in another aspect, the invention features an interferometric analysis method for measuring surface roughness based on height-scanning interferometry data for a test surface. The method includes: calculating a coherence profile and a phase profile for the test surface based on the data; calculating an experimental phase gap map based on a difference between the phase profile and the coherence profile; and determining a surface roughness profile based on the experimental phase gap map. For example, determining the surface roughness profile may include calculating a variance map of the experimental phase gap map and determining the surface roughness profile based on the variance map. The variance map may include calculating at least one trigonometric function for each of multiple points of the experimental phase gap map, smoothing the results of each trigonometric function over the multiple points, and determining the variance map based on the smoothed trigonometric functions. Furthermore, the method may include any of the features described further above in connection with the first or second inventive methods.

In general, in another aspect, the invention features an interferometry system including: a height-scanning interferometer which during operation measures height-scanning interferometry data for a test surface; and an electronic processor coupled to the height-scanning interferometer. During operation the electronic processor: calculates a coherence profile and a phase profile for the test surface based on the data; calculates an experimental phase gap map based on a difference between the phase profile and the coherence profile; filters the experimental phase gap map to remove noise; and uses the filtered phase gap map to determine a height profile of the test surface.

In general, in another aspect, the invention features an interferometry system including: a height-scanning interferometer which during operation measures height-scanning interferometry data for a test surface; and an electronic processor coupled to the height-scanning interferometer. During operation the electronic processor: calculates a coherence profile and a phase profile for the test surface based on the data; calculates a filtered phase gap map based on a difference between the phase profile and the coherence profile; and uses the filtered phase gap map to determine a height profile of the test surface.

In general, in another aspect, the invention features an interferometry system including: a height-scanning interferometer which during operation measures height-scanning interferometry data for a test surface; and an electronic processor coupled to the height-scanning interferometer. During operation the electronic processor: calculates a coherence profile and a phase profile based on the data; calculates an experimental phase gap map based on a difference between the phase profile and the coherence profile; and determines a surface roughness profile based on the experimental phase gap map.

Any of these interferometry systems may further include features corresponding to any of the features described above in connection with the inventive methods.

Finally, in another aspect, the invention features a computer readable medium including a program that causes a processor to perform any of the inventive methods described above.

Embodiments of the invention may reduce sensitivity to a mismatch between coherence profile data and phase profile data. As a result, fringe orders can be more accurately determined and used to determine absolute height profiles. Additional embodiments of the invention may provide a measure of surface roughness based the phase gap analysis.

Other aspects, advantages, and features of the invention follow.

BRIEF DESCRIPTION OF THE DRAWINGS

FIG. 1 is a flow chart of an interferometric data processing method.

FIG. 2 is a flow chart of an embodiment of the interferometric data processing method that blends multiple techniques using the phase gap variance for the weighted blending.

DETAILED DESCRIPTION

Figure 3:
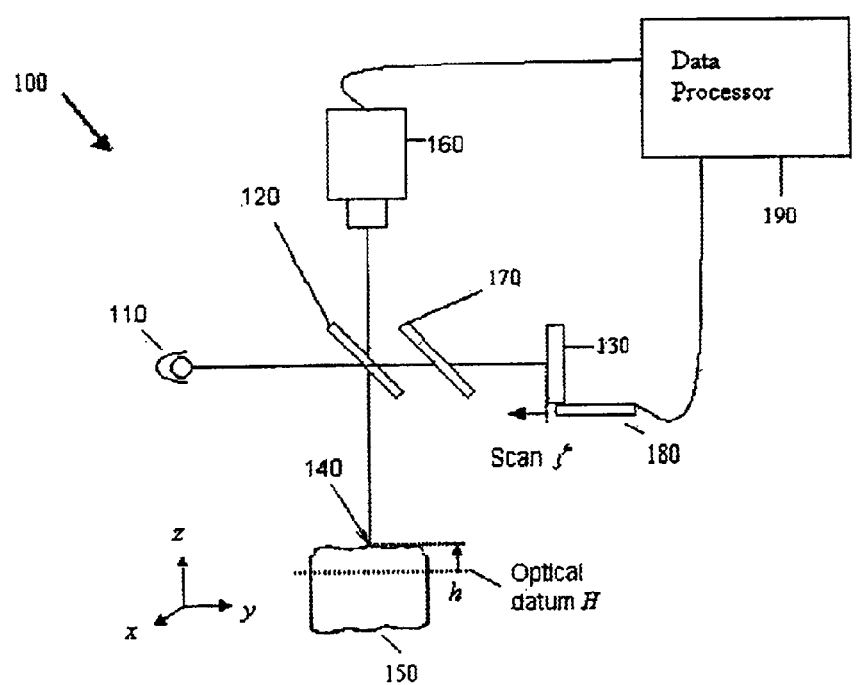
FIG. 3 is a schematic diagram of a two-beam height-scanning interferometer.

FIG. 1 is a flow chart of a data processing method 200 for calculating a surface profile from height scanning interferometry data. The basic steps of the method are summarized below and are followed by a more detailed description.

In step 210, a height scanning interferometer scans the surface of a part to collect height scanning interferometry data. In step 220, the method calculates a phase profile and a coherence height profile based on the interferometry data. Typically, the coherence profile has larger errors than those of the phase profile. On the other hand, the phase profile is not a unique surface profile because it suffers from the fringe order ambiguity.

By combining the information in the coherence height profile and the phase profile, it is possible to overcome some of the drawbacks of either profiling method. Specifically, the coherence profile solves the fringe order ambiguity in the phase profile. This leads to a high resolution phase height profile. Unfortunately, errors and imperfections can distort the coherence height profile. As a result, the correct fringe order in the phase profile is not accurately predicted and the high resolution phase height profile contains errors. Moreover, it is difficult to directly determine such errors from either the phase or coherence profiles.

Data processing method 200 addresses such problems by analyzing phase gap related to the difference between the coherence profile and the phase profile. Step 230. calculates the phase gap. Under ideal conditions without errors, the two profiles should match and the phase gap should be constant. Error disrupts this match, however, and are apparent in the phase gap. However, because ideal phase gap should be constant, such errors can be reduced by smoothing the phase gap. Thus step 230 further smoothes the phase gap to generate a low-noise substitute. For example, smoothing the phase gap reduces the impact of random noise and low spatial frequency distortions.

Once random noise errors are removed, step 240 applies standard phase unwrapping techniques to remove unwanted 2-π phase jumps in the phase gap. Using this smoothed and unwrapped phase gap, step 250 calculates a field corrected phase. This phase profile is accurate up to an overall phase. By accounting for phase and dispersion offsets, step 260 accounts for this overall phase offset. Finally step 270 calculates a high resolution phase height profile of the surface.

Referring again to step 210, a height scanning interferometer is used to collect interferometric data. One example of a height scanning interferometer is the two-beam interferometer shown in FIG. 3. Interferometer 100 includes a broadband light source 110, interferometer optics such as a beam splitter 120 for defining a reference path to a reference mirror 130 and a measurement path to a surface 140 of an object part 150, and a camera 160 for recording interferometric images resulting from recombining the wavefronts from the reference and measurement legs. The surface 150 has features of height h(x) in the z direction referenced to a fixed optical datum H. Interferometer 100 also includes a mechanism 180 for modifying or scanning the optical paths in a controlled way such as a piezoelectric transducer coupled to reference mirror 130, and a data processor 190 coupled to camera 160 and the scanning mechanism for analyzing the interferometric data recorded by the camera. A dispersion compensation element 170 is positioned in the reference path to compensate for the path lengths for dispersion caused by the beam splitter.

The data processor 190 records intensity data $I(\zeta,x)$ in successive camera frames during a continuous scan, where we have abbreviated the x,y lateral field position of the pixel simply as (x). The intensity as a function of scan position is given by $$I(\zeta,x)=1+V[h(x)+\tau(x)/2n-\zeta]\cos[2nk_0(h(x)-\zeta)+\gamma(x)] \quad (1)$$

where V is the fringe contrast envelope. The envelope V is proportional to the Fourier transform of the spectral distribution of the light as detected by the camera, including the spectral sensitivity of the camera itself. $\zeta$ is the reference mirror scan position, $\gamma(x)$ is the phase change on reflection (PCOR) evaluated at the nominal wavenumber $k_0$. It is well known that upon reflection from a surface, a light beam is given an additional phase offset dependent on the optical properties of the reflecting surface. This is the physical basis for PCOR. The value of $\zeta(x)$ includes PCOR contributions from not only the sample but also the interferometer optics, and any constant offsets resulting, e.g., from the starting position of the scan $\zeta$. The coefficient $\tau(x)$ corresponds to the linear dispersion of PCOR evaluated at the nominal wavenumber $k_0$. Dispersion in PCOR results from the frequency dependence of PCOR. A first order (linear) correction for this frequency dependence is given by $\tau(x)$.

The distance traveled by the reference mirror between two successive camera frames is the fundamental unit of measure. This distance is defined as a frame and will be used throughout. This is quite different from conventional phase shifting interferometry, for which the light source wavelength is the basic metric. For this reason, all height- or scan-related variables are expressed in frame units or the equivalent. The height profile h(x) itself will be calculated in frame units.

Figure 4:
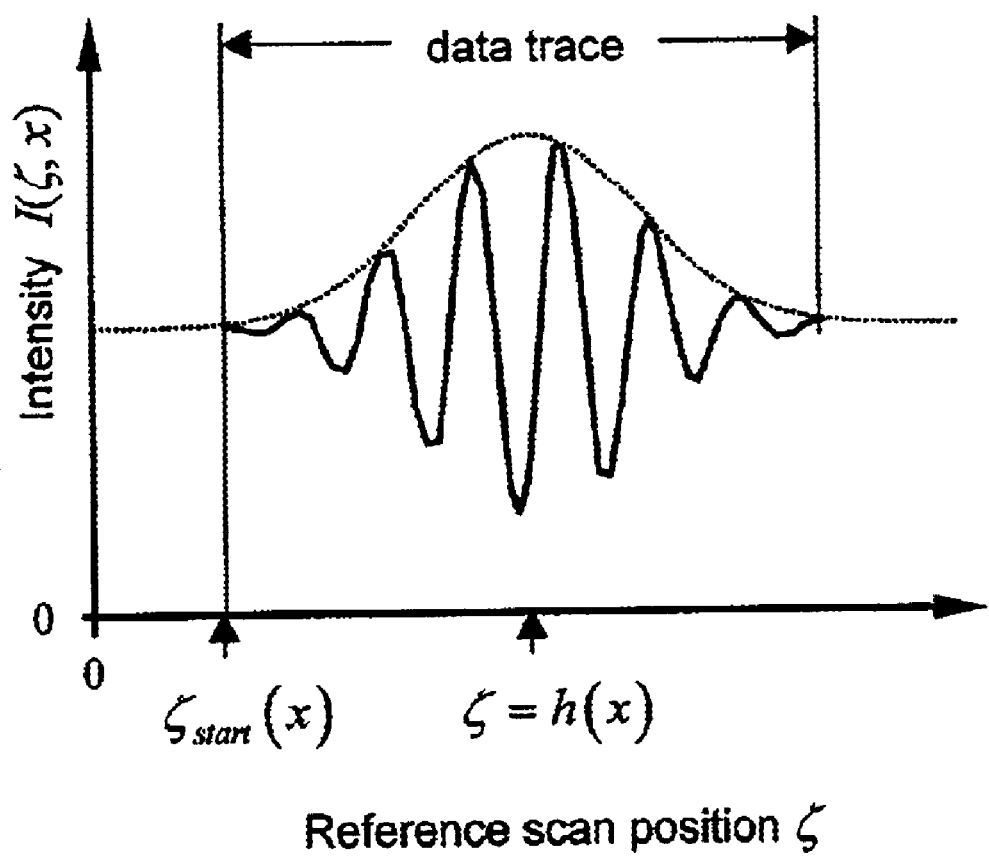
FIG. 4 is a single-pixel interference pattern showing a high-contrast area beginning at scan position $\zeta_{start}(x)$. The scan position $\zeta=0$ corresponds to the optical datum H shown in FIG. 3.
Figure 5:
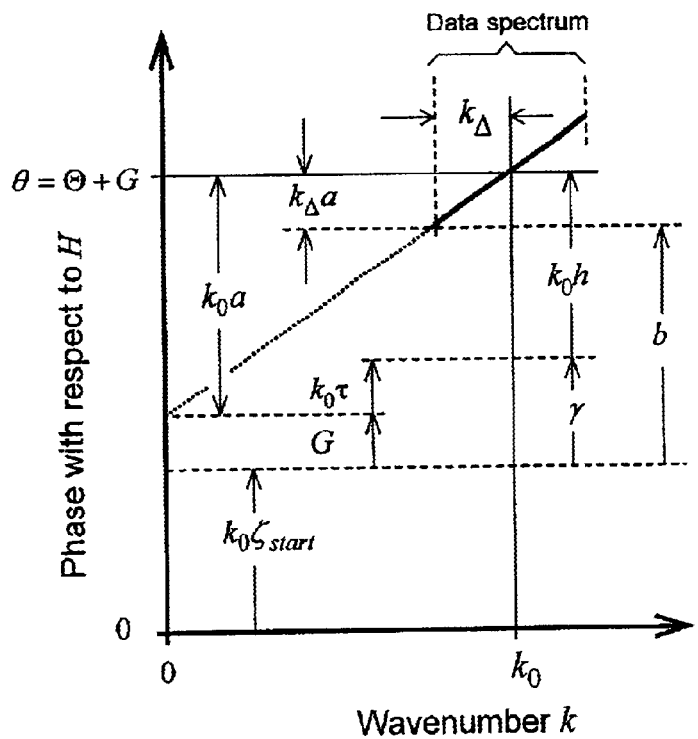
FIG. 5 is a phase and frequency domain graph of the Fourier transform of typical HSI data. The quantity G is the phase gap, which is a measure of agreement between the coherence and phase data.

FIG. 4 shows an example of such intensity vs. scan position data. The broadband interference pattern shown in FIG. 4 is highly localized near the zero optical path difference position, for which the scan position $\zeta$ is close to h(x). To conserve memory and accelerate computations, step 210 sub-samples the interference pattern and records only a 64-frame data trace centered on this high-contrast position. The scan position $\zeta_{start}(x)$ corresponding to the first camera frame of the data trace is typically different for every pixel in the field of view.

Using the interferometric data, step 220 calculates both the coherence and phase profile. The method does not analyze the fringe contrast of the intensity pattern shown in FIG. 4. Instead, the method focuses on the behavior of the interference phase as a function of wavenumber in the Fourier decomposition of I($\zeta$,x). Following data acquisition, the step 220 performs a Fourier transform (FT), resulting in spectrum data P(k,x) and phase data φ(k,x):

$$P(k,x) = |FT[I(\zeta,x)]|^2 \tag{2}$$

$$\phi(k,x) = arg\{FT[I(\zeta,x)]\} \tag{3}$$

where k is the wavenumber. A typical value for k is π/2 radians/frame, the equivalent of 4 camera frames per cycle of interference or 16 cycles per 64-frame trace.

The useful phase data φ(k,x) generated by the Fourier transform in Eq. (3) are restricted to a wavenumber range consistent with the spectral distribution P(k,x) of the source. The peak in the spectrum defines a nominal wavenumber $k_0$ and a useful spectral range beginning at $k_0-k_\Delta$. A linear least-squares fit to the phase data within this range, weighted by the spectral distribution P(k,x), provides for each pixel a slope $$a(x) = d\phi/dk|_x \tag{4}$$

and an intercept $$b(x) = \phi(k_\phi - k_\Delta, x) \tag{5}$$

The phase slope offset by the starting scan position $\zeta_{start}(x)$ can be used to define a coherence profile, expressed here in phase units at the nominal wavenumber $k_0$:

$$\Theta(x) = k_0 a(x) + k_0 \zeta_{start}(x) \tag{6}$$

The coherence profile is closely related to the localization of the interference fringes. The phase at $k_0$ offset by the starting scan position $\zeta_{start}(x)$ can be used to define the phase profile:

$$\theta(x) = k_\Delta a(x) + b(x) + k_0 \zeta_{start}(x). \tag{7}$$

In Eq. (7), potential fringe-order ambiguity is suppressed for the sake of clarity in the theoretical presentation.

The coherence and phase profiles are both indicative of surface height profile. FIG. 3 further details the relevant features of the frequency domain phase data. In a linear expansion, the interference phase φ(k,x) about a nominal wavenumber $k_0$ near the center of the FT spectrum is $$\phi(k,x) = k[h(x) - \zeta_{start}(x)] + \gamma(x) + (k-k_0)\tau(x). \tag{8}$$

From Eq. (8) we can extract two formulas for surface height with respect to the optical datum H using the phase and coherence profiles. Using the definitions of θ(x), Θ(x) from the previous page, inversion of Eq. (8) at $k=k_0$ yields $$h(x) = \frac{1}{k_0}[\theta(x) - \gamma(x)]. \tag{9}$$

Inversion of the derivative of Eq. (8) with respect to k gives $$h(x) = \frac{1}{k_0}[\Theta(x) - k_0\tau(x)]. \tag{10}$$

Eq. (9) is the basis for a high-resolution measurement of surface height; however, in that phase detection is periodic in 2π radians, there is a potentially unknown fringe order offset to an experimental measurement of θ(x). The coherence-based calculation of Eq. (10) is inherently lower resolution than Eq. (9), but is free of fringe-order ambiguity.

As mentioned above, the coherence and phase information are combined to provide high-resolution phase height absolutely. Of particular interest therefore is the difference or phase gap G(x) between the phase and coherence profiles, which may be defined as:

$$G(x) = \theta(x) - \Theta(x). \tag{11}$$

In theory, the phase gap is the k=0 intercept of the phase data and is given by $$G(x) = \gamma(x) - k_0\tau(x). \tag{12}$$

It is clear from Eq. (11) that the phase gap G(x) is a measure of the agreement between the phase profile and the coherence profile (see FIG. 4). The phase gap plays an important role in the detailed error processing that follows.

In practice, experimental uncertainties complicate the theoretical equations of the previous section and make accurate fringe order estimation error prone. The following steps (steps 230–260) address these errors. To clarify this discussion, error terms are explicitly included. The experimentally measured coherence profiles $\Theta_{ex}(x)$ based on phase slopes have significant errors $\epsilon_\Theta(x)$ in the form of random noise and low-spatial frequency distortions, frequently exceeding 2π radian:

$$\Theta_{ex}(x) = \Theta(x) + \epsilon_\Theta(x), \tag{13}$$

where the subscript ex emphasizes that this is an experimental value. A noise term $\epsilon_\Theta(x)$ also corrupts the experimental phase profile, which additionally suffers from an inherent fringe-order ambiguity:

$$\theta_{ex}''(x) = \theta(x) + \epsilon_\theta(x) + 2\pi[M(x) + M_0] \tag{14}$$

where the integer M(x) is a field-dependent fringe order error and $M_0$ is an overall fringe-order offset error with respect to the theoretical phase profile θ(x). The double primes emphasize this two-fold ambiguity. The factor of 2π assumes that the phase units are in radians.

For surfaces that appear smooth and uniform at the wavelength of the source light, the phase noise term $\epsilon_\theta(x)$ is generally very much less than the coherence noise term $\epsilon_\Theta(x)$ and in this limit, therefore, the fundamental task is to determine the fringe order error $M(x)+M_0$ appearing in Eq. (14), so that we can use the low-noise phase profile to measure surface form with high precision.

Because of the possibility of discontinuous surface features, we cannot directly determine fringe order by inspection of the experimental phase profile $\theta_{ex}''(x)$ alone.

Instead, step 230 calculates the phase gap between the coherence and phase profiles according to:

$$G_{ex}''(x)=\theta_{ex}''(x)-\Theta_{ex}(x). \quad (15)$$

The structure of the phase gap is known without the need for assumptions about the surface profile being measured. As such, it is a stable objective tool used to identify and control errors. The theoretical phase gap G(x) is expected to be nearly constant over the entire surface, regardless of surface orientation and even in the presence of sharp surface feature many times higher than one wavelength. Combining Eqs. (13), (14) and, (15)

$$G_{ex}''(x)=G(x)+\epsilon_{74}(x)-\epsilon_\Theta(x)+2\pi[M(x)+M_0]. \quad (16)$$

In the limit of noise-free data (e.g. $\epsilon_{73}=\epsilon_\Theta=0$ ), Eq. (16) is simply the fringe order error plus the known theoretical phase gap G(x). In this limit, the fringe order errors are easy to detect and quantify. It makes sense therefore to analyze the experimental phase gap in detail for the purpose of removing fringe-order errors in the phase profile.

In order to accurately estimate the fringe order, the accidental 2-π steps between neighboring pixels are corrected. These 2-π steps can be connected by using standard phase unwrapping techniques. See, e.g., D. C. Ghiglia and M. D. Pritt, "Two-dimensional phase unwrapping: Theory, algorithms, and software" (John Wiley & Sons, Inc. New York, 1998). Unfortunately, the connect procedure may be complicated by the random noise in the error terms $\epsilon_{73}(x)$, $\epsilon_\Theta(x)$, which make direct connection of the phase gap data $G_{ex}''(x)$ prone to mistakes.

Therefore, prior to using the connect procedure, the method first removes random errors. In addition, to simply calculated the phase gap, step 230 approximates the general trends in the phase gap with a relatively noise-free substitute Γ''(x):

$$\Gamma''(x)=approx(G_{ex}'') \quad (17)$$

where the approx function represents any one of a number of strategies for obtaining a low-noise representation of the phase gap.

Using this relatively noise-free phase gap, step 240 applies a connect procedure to remove 2-π steps between pixels, using any one of the standard techniques for unwrapping phase data:

$$\Gamma'(x)=connect[\Gamma''(x)]. \quad (18)$$

The connected, approximate phase gap Γ'(x) is free of the field-dependent fringe order term:

$$\Gamma'(x)\approx G_{ex}''(x)-2\pi M(x). \quad (19)$$

Inversion of Eq. (19) in view of Eq. (15) yields $$M(x) = \text{round}\left[\frac{\theta_{ex}''(x)-\Theta_{ex}(x)-\Gamma'(x)}{2\pi}\right] \quad (20)$$

where the function round returns the integer nearest its argument.

Using the smoothed and connected phase gap, step 250 calculates a field-corrected experimental phase profile $$\theta_{ex}'(x)=\theta_{ex}''(x)-2\pi M(x). \quad (21)$$

and a corresponding phase gap free of field-dependent fringe order errors:

$$G_{ex}'(x)=G_{ex}''(x)-2\pi M(x). \quad (22)$$

The single prime indicates that the field-dependent errors have been removed, but there is still an overall fringe order error $M_0$ common to all pixels. Parenthetically, this calculation may change the numerical value of $M_0$ depending on the starting point of the connect process, but this has no practical consequence.

Step 260 removes the overall fringe order error $M_0$, making it possible to measure surface heights absolutely with respect to an established datum. To permit absolute height measurements with respect to an optical datum plane requires the dispersion and phase offsets τ and γ. From Eq. (15) and Eq. (22) the global average $<G_{ex}'>$ of $G_{ex}'(x)$ over all valid pixels is approximately $$<G_{ex}'>\approx<G>+2\pi M_0, \quad (23)$$

where the global average of the error terms $\epsilon_\Theta(x)$, $\epsilon_\Theta(x)$ is assumed to be small (e.g. $<<\pi$). Then, assuming we have a good value for the theoretical phase gap G, we can invert Eq.(23) and determine the fringe order $M_0$:

$$M_0 = \text{round}\left[\frac{\langle\theta_{ex}'\rangle-\langle\Theta_{ex}\rangle-\langle G\rangle}{2\pi}\right] \quad (24)$$

and calculate a final experimental phase profile free of all fringe-order errors:

$$\theta_{ex}(x)=\theta_{ex}'(x)-2\pi M_0 \quad (25)$$

Note that $\theta_{ex}(x)$ is free of both relative fringe order error (i.e. M(x) has been removed using Eq. (21)) and it is free of the overall fringe order error $M_0$. Therefore the phase profile expressed in Eq. (25) represents the absolute phase relating the surface profile to optical datum H. The final experimental height is calculated in step 270.

$$h_{ex}(x) = \frac{1}{k_0}[\theta_{ex}(x)-\gamma(x)] \quad (26)$$

Note that this height value is in units of camera frames, assuming that the phase values are in radians and $k_0$ is in units of radians per frame.

From this general description of method 200, a number of specific embodiments will now be discussed. In one embodiment of the processing method, step 230 reduces the impact of random noise by using a global average for the approximate phase gap. If the noise terms $\epsilon_\Theta(x)$, $\epsilon_\Theta(x)$ have a field dependence of much less than ±π, then very often it is sufficient to set the approximate phase gap Γ' (x) to a single nominal value. One approach is to average the phase gap. Because phase data are periodic, an appropriate averaging technique is to average the sine and cosine data, rather than the phase gap itself, to avoid complications related to phase wrapping. Thus step 230 uses:

$$<\Gamma'>=\arctan 2[<C>,<S>] \quad (27)$$

where $$S(x)=\sin[G_{ex}''(x)]$$
$$C(x)=\cos[G_{ex}''(x)] \quad (28)$$

and the < > brackets indicate global averaging over all valid data points. <Γ'> is used in place of Γ'(x). The arctan 2[x,y] function calculates arctan(y/x), and returns an angle in the correct quadrant. Note that this procedure in principle makes step 240 trivial since it defines <Γ> to be simply connected. Therefore when using such global averaging, it is possible to by-pass the connect operation in Eq.(18) and proceed to step 250.

Despite the simplicity of the global average technique described, it may suffer from failures resulting from the field dependence in the fringe order error M(x). Most such errors relate to field-dependent coherence errors $\epsilon_\Theta(x)$ caused by optical aberrations, uncompensated dispersion, dissimilar materials and diffraction. Because these problems are often field dependent, they can generate noticeable errors such as 2-π discontinuities, often along steep surface slopes or boundaries between features and materials.

In other embodiments, step 230 uses an approach, which filters the stochastic noise in the phase gap. Smoothing techniques are applied to define the approximate phase gap, which is defined as $$\Gamma_{sm}''(x) = \arctan 2[C_{sm}(x), S_{sm}(x)]. \tag{29}$$

The subscript sm indicates that a field-averaging smoothing filter has been applied to the data:

$$S_{sm}(x) = \text{smooth}[S(x)]$$

$$C_{sm}(x) = \text{smooth}[C(x)] \tag{30}$$

The filter function smooth may for example be a simple pixel averaging algorithm, a convolution algorithm, or any other type that properly accounts for invalid data points. We generally use a double pass of a 3×3 pixel average for testing purposes. $\Gamma_{sm}''(x)$ is used in place of $\Gamma''(x)$ and the method proceeds to step 240. It is most effective on smooth surfaces with low noise in the coherence profile.

In other embodiments, step 230 is designed to cope with errors due to diffraction. Coherence information, i.e., phase derivative data, is sensitive to diffraction. Diffraction effects generate large, localized swings in the coherence error term $\epsilon_\Theta(x)$. An approach to detecting and suppressing these distortions is to subtract edge effects from the coherence profile as follows. First, the edges in the coherence profile are located using $$\delta\Theta(x) = \Theta_{ex}(x) - \text{smooth}[\Theta_{ex}(x)] \tag{31}$$

Next, placing some limits, e.g. ±π/2 on δΘ(x) the method defines:

$$\Theta_{sm}(x) = \Theta_{ex}(x) - \delta\Theta(x). \tag{32}$$

We then calculate the approximate phase gap using this smoothed version of the coherence profile:

$$\Gamma''(x) = \theta_{ex}''(x) - \Theta_{sm}(x). \tag{33}$$

This smoothed coherence profile $\Theta_{sm}(x)$ may also be used in place of $\Theta_{ex}(x)$ in Eqs.(20) and (24). The smoothing has the effect of rounding the sharp edges of features where diffraction effects are most prominent.

In some embodiments, step 240 approximates the overall shape of the connected phase gap by a low-order surface fit. A surface fit can be an effective means of calculating an approximate phase gap entirely free of random noise. An important example is dispersion in a Michelson microscope objective, for which it is not unusual for the beam splitter prism to have a small amount of wedge, resulting in an overall tip and tilt of the phase gap surface. A plane fit would be sufficient to model this error. An example fitting function for the x coordinate only is $$\Gamma_{fit}(x) = c_0 + c_1 x + c_2 x^2. \tag{34}$$

The coefficients are found by standard linear least-squares fit to a first-pass connected phase gap (see Eq. (18)). We then use $\Gamma_{fit}(x)$ in place of $\Gamma(x)$ and proceed to Step 250. The major benefit of surface fitting is that it helps to bring together potentially isolated surface regions having different noise levels. This is especially useful for uniformly smooth surfaces that have varying amounts of data noise according to the amount of reflected light captured by the optics.

In additional embodiments, the concepts described above can be used together and blended together to produce a single method that addresses multiple error types. The flow chart of FIG. 2 summarizes such an embodiment.

For rough surfaces, the method relies on the global averaging, which prevents discontinuities from propagating into improbable structures via the connect process. For smooth, uniform surfaces with gradual, field-dependent phase gap changes, the method uses the smoothing filter approach. For smooth surfaces with steps, the method softens the edges to reduce diffraction effects that can spoil the coherence profile. For mixed surface textures, the method allows a surface fit to the phase gap to extend the results from low-noise areas to high-noise areas that would otherwise be deleted.

The moderator for this blending of phase-gap approximation strategies is a phase gap variance. One example of a phase gap variance is given by $$V(x) = 1 - S_{sm}^2(x) - C_{sm}^2(x), \tag{35}$$

where $S_{sm}(x)$, $C_{sm}(x)$ were defined in Eq.(30). Note that $0 \leq V(x) \leq 1$. The noise-free phase gap profile would generate variance values close to zero everywhere; whereas a totally random phase gap results in variances very nearly equal to one. The variance may also be smoothed to suppress isolated spikes:

$$V_{sm}(x) = \text{smooth}[V(x)] \tag{36}$$

In this case, the smoothing operation includes the invalid points as V=1 data, to emphasize the high uncertainty in the phase gap value for small, isolated data regions. The phase gap variance is used twice in this embodiment, once in step 230 and once in step 240. The first is just prior to the connect operation, when the smoothing filter and global average strategies are blended together.

Specifically steps 210 and 220 as described generally are followed. Beginning with step 230, the method applies a number of the error reducing methods. First, step 230 applies the smoothing methods to reduce diffraction effects (Eq. (32)). The resulting smoothed coherence profile is used to calculate an approximate phase gap $\Gamma''(x)$ (Eq. (33)). This approximate phase gap is used as input for creating the global average approximate phase gap (Eq. (27)) and the smoothed approximate phase gap (Eq. (29)). These are combined to form the blended approximate phase gap using the phase gap variance according to $$\Gamma_{blend}''(x) = [1 - V_{sm}^W(x)]\Gamma_{sm}'' + V_{sm}^W(x)<\Gamma>. \tag{37}$$

In the high-variance limit V=1, usually encountered on very rough surfaces, the phase gap reverts to the global average calculation <Γ>. In the low variance limit, the blended approximate phase gap tends towards the smoothed phase gap $\Gamma_{sm}''(x)$. The adjustable exponential parameter w controls how much freedom we wish to allow the algorithm to adapt to different surface types. For a value of w=0, the calculation uses only the global average, whereas a high value for w (e.g. >>1) emphasizes the smoothing technique. Generally either w=2 or w=4 is used.

In step 240, there is a second blending of approximate phase gaps. First the blended approximate phase gap from step 230 is connected (Eq. (18)). In addition, a surface fit is produced by a least square fit to this connected, blended approximate phase gap (Eq. (34)). In this case, uses these two resulting approximate phase gaps:

$$\Gamma_{blend}'(x)=[1-V_{sm}^{W}(x)]\Gamma'(x)+V_{sm}^{W}(x)\Gamma_{fit}'(x). \quad (38)$$

The blended, connected phase gap profile $\Gamma_{blend}'(x)$ relies on the surface fit $\Gamma_{fit}'(x)$ in regions where the smoothed phase gap variance $V(x)$ is high and it relies on the $\Gamma'(x)$ in regions of low variance.

Figure 6:
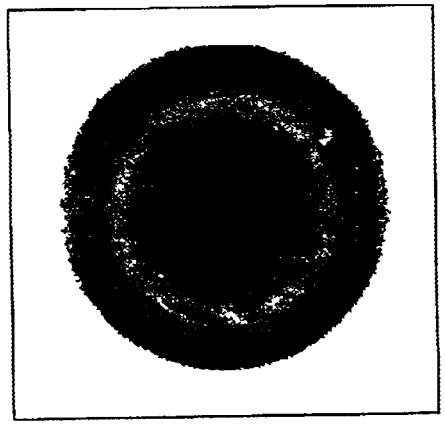
FIG. 6 is profile of a sphere using the embodiment outlined in FIG. 2.
Figure 7:
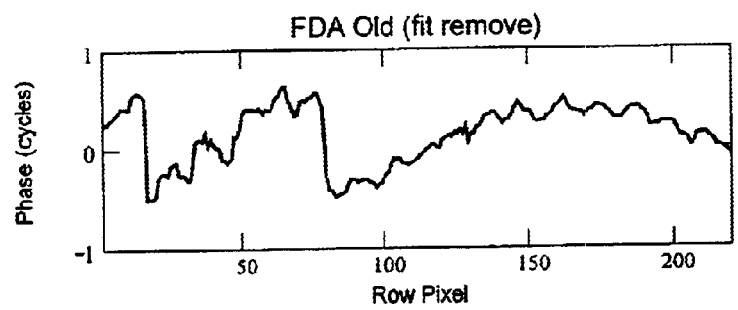
FIG. 7 is a phase profile of the sphere in FIG. 6 after removal of best-fit quadratic surface and median filtering to remove spikes.
Figure 8:
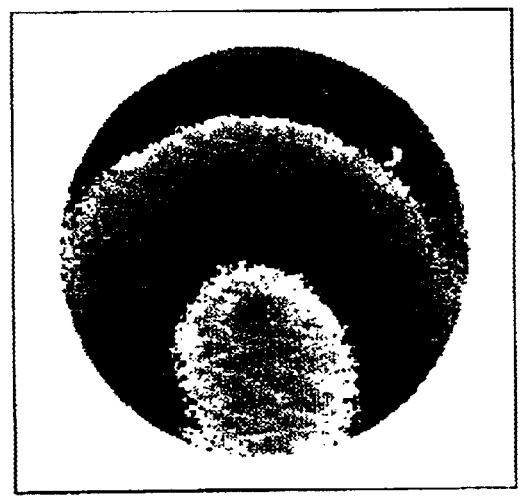
FIG. 8 is a gray scale image of a wrapped phase gap from the sphere in FIG. 6, revealing a field dependence that mimics the part shape.

Using this blended connected phase gap, the method proceeds through steps 250, 260 and 270 as described above. Typically this results in robust phase height profiles that can be applied to many samples. One of the motivations for developing the processing method has been to solve the problem of 2-π step discontinuities on objects having large slopes. An important example is the smooth sphere shown in FIG. 6. It shows a false-color 320×240-pixel profile of a sphere using the embodiment outlined in FIG. 2. FIG. 7 shows cross section of a phase profile of the sphere from FIG. 6. The phase is calculated in $k_0$ phase units after removal of best-fit quadratic surface and median filtering to remove spikes. Only a single value was used for the approximate phase gap for all x. Note the 1-cycle discontinuities at pixels 20 and 80, which evidence fringe-order estimation failures. The cross sectional profile in FIG. 7 is segmented into circular regions with 2-π step discontinuities between them. FIG. 8 shows the wrapped phase gap image for the spherical part. It reveals a field dependence where there should be none that mimics the part shape.

Figure 9:
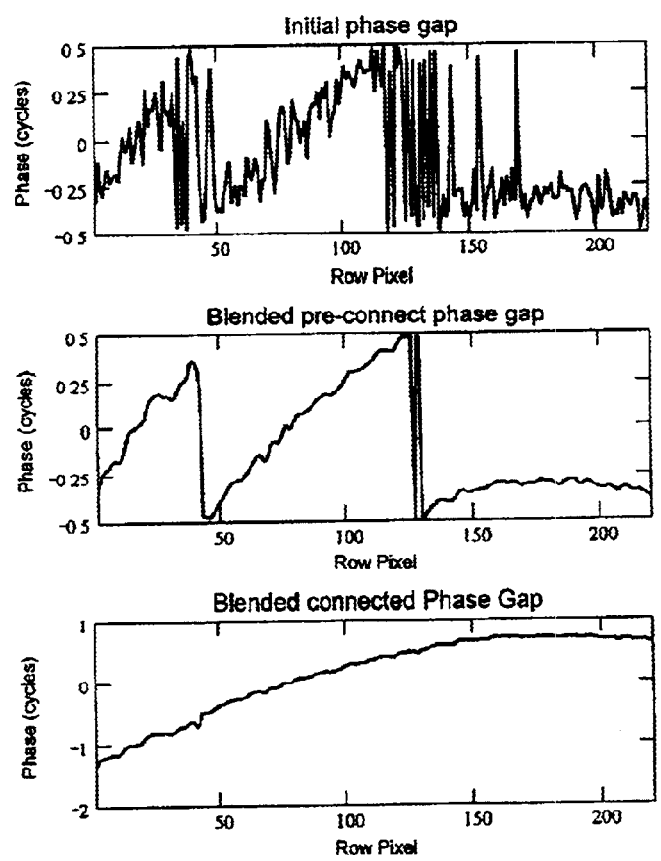
FIG. 9 is phase gap processing history for a column of data through the middle of FIG. 8.
Figure 10:
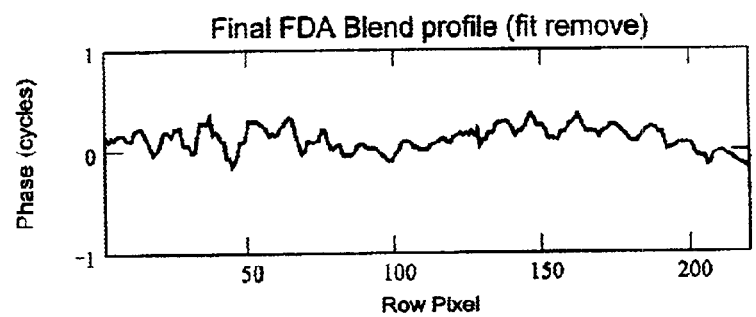
FIG. 10 is a phase height profile of the sphere of FIG. 6 for a row of data determined using the method outlined in FIG. 2. The profile is displayed in $k_0$ phase units after removal of best-fit quadratic surface.

Following the embodiment outlined in FIG. 2, the profile in FIG. 8 is converted to a connected phase gap that corrects the coherence data prior to analyzing the phase data for fringe order variations. FIG. 9 shows the sequence of events for a cross section of the phase gap from FIG. 8. A blended phase gap is determined according to Eq. (37) and them connected according to Eq. (38). The resulting high resolution phase profile is shown in FIG. 10. Note the best-fit quadratic fit has been removed in FIG. 10. The 1-cycle discontinuities from FIG. 7 are now absent.

Figure 11:
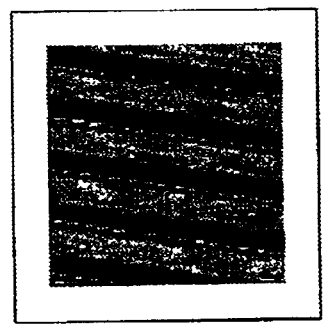
FIG. 11 is phase height profile of roughness standard.
Figure 12:
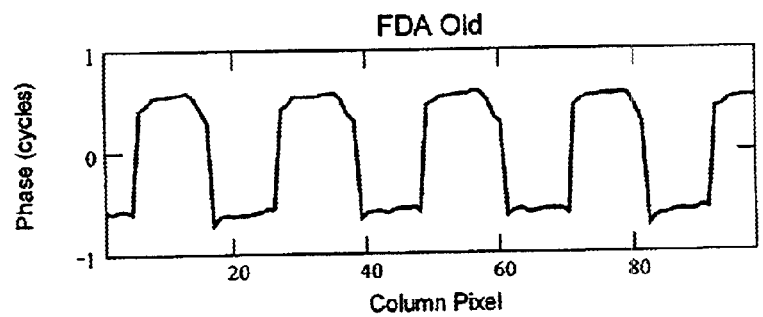
FIG. 12 is a cross-section of the phase height profile of FIG. 11.

In another example, there can be large errors when profiling a roughness standard. FIG. 11 shows a square-shaped grating-like structure of a phase profile of an 88 nm peak-to-valley (PV) roughness standard. FIG. 12 shows a cross section of the phase profile. Note that average PV as shown in the phase profile is greater than 300 nm (where 88 nm translates to 0.3 radian in FIG. 12). This factor of four error was caused by the fringe order error. In this case, the approximate phase gap used to calculate the phase profile in FIG. 12 used only a single value to estimate the phase gap. Note the significant distortions attributable to diffraction effects in the coherence profile, whereas the ideal phase gap would be a constant.

Figure 13:
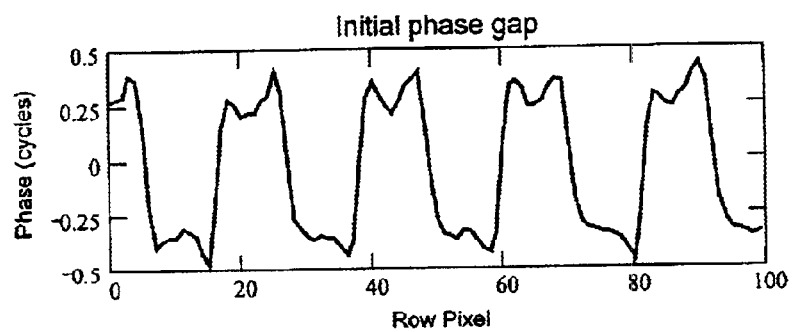
FIG. 13 is a phase gap for the example of FIG. 11, showing significant distortions attributable to diffraction effects in the coherence profile. The ideal phase gap would be a constant.

Notably, the phase gap profile in FIG. 13, calculated without pre-smoothing the coherence profile, indicates such distortions as the phase gap mimics the actual surface profile and is oscillating over a phase range of several radians. The oscillation takes up nearly the entire 2π (one cycle) range of the phase gap profile. Thus the phase gap indicates errors related to optical diffraction phenomena because the ideal phase gap would be a constant over the entire field, regardless of surface structure or orientation. The phase information is more stable in the presence of diffraction effects; therefore, the phase gap profile shown in FIG. 13 is essentially a map of where and by how much the coherence profile has been distorted.

Figure 14:
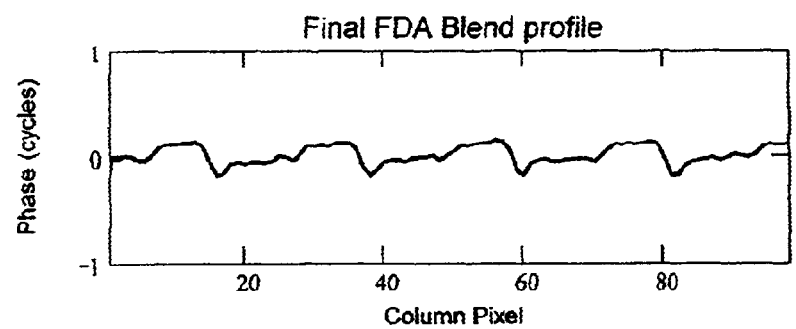
FIG. 14 is a phase height profile of the roughness standard of FIG. 11 for a column of data using the embodiment outlined in FIG. 2.

FIG. 14, which is a cross-section of a phase height profile calculated using the embodiment of FIG. 2, shows that the embodiment is able to overcome these problems and generate a more realistic profile. Note that the resulting phase profile gives the correct 0.3 nm PV excursion (0.3 radian at a nominal 600 nm wavelength). A useful step in the process is the pre-filtering of the coherence profile, which smoothes the diffraction effects at the sharp grating edges and facilitates the phase-gap connect process. The connected phase gap compensates for the large, false excursion of the coherence profile, resulting in a correct value for the surface roughness in spite of the presence of diffraction effects.

The absolute-height calculations (Step 260 in FIG. 1 and FIG. 2) involve phase and dispersion offsets γ(x), τ(x). The methods described above do not require that we know what these offsets are in order to be useful. For example, if we care only about the surface profile and we have high confidence that the instrument has few system errors that would distort this profile, then we can simply set these offsets to zero. In other cases, however, an estimate for such offsets can be useful.

The phase and dispersion offsets have contributions from both the system (subscript sys) and the part itself (subscript part):

$$\gamma(x)=\gamma_{part}+\gamma_{sys}(x) \quad (39)$$

$$\tau(x)=\tau_{part}+\gamma_{sys}(x). \quad (40)$$

The system phase offset $\gamma_{sys}(x)$ is very useful even for routine profiling, because it is a measure of the distortions in the measurement system. The system dispersion offset $\tau_{sys}(x)$ is useful for absolute height measurements with respect to a datum. The part offsets $\gamma_{part}$, $\tau_{part}$ are useful for relational measurements between surfaces or surface regions having dissimilar materials. Note that the part offsets $\gamma_{part}$, $\tau_{part}$ may be different from one surface region to another, however, variations within any one region are typically small. For simplicity, therefore, an explicit x,y field dependence is not shown. Finally, we note that the process of establishing the offsets γ(x), τ(x) is related to a particular choice of the nominal wavenumber $k_0$.

Figure 15:
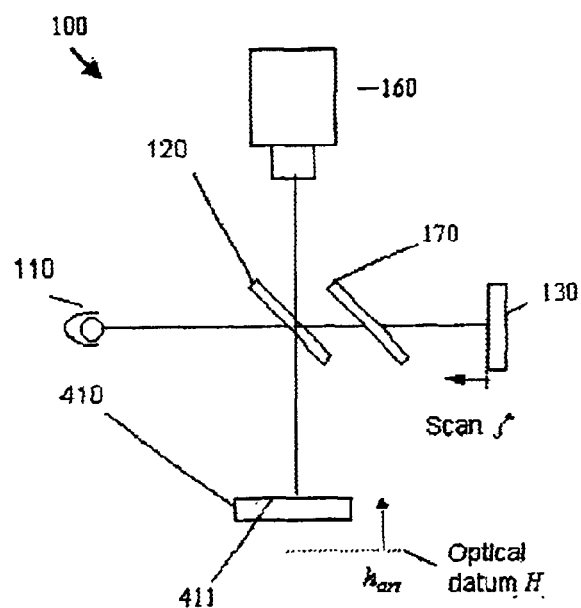
FIG. 15 is a schematic diagram of an interferometer used to characterize both PCOR and the dispersion in PCOR using a known dielectric artifact.

The values may be entered as known constants by the user or they may be measured. The procedure that establishes $\gamma_{sys}$, $\tau_{sys}$ is a system characterization. System characterization also establishes implicitly the location and shape of the optical profiler datum H. System characterization involves a characterization artifact having known optical properties $\gamma_{art}$, $\tau_{art}$ and surface form $h_{art}$. Referring to FIG. 15, the artifact 410 is inserted temporarily in the field of view of interferometer 100 and a measurement of the phase profile θ(x) of the artifact surface 411 provides the necessary information for determining the system phase offset $\gamma_{sys}(x)$. Referring to Eqs. (9) and (39), it follows that $$\gamma_{sys}(x)=\theta(x)-\gamma_{art}(x)-2k_0h_{art} \quad (41)$$

Note that the phase profile θ(x) should be unwrapped, meaning that 2π fringe jumps must be removed under the assumption that the artifact is a continuous surface.

Once the $\gamma_{sys}(x)$ is known, the value of $\tau_{sys}(x)$ can be determined as $$\tau_{sys}(x)=(\gamma_{art}+\gamma_{sys}(x)-G_{ex}''(x))/k_0-\tau_{art} \quad (42)$$

where $G_{ex}"(x)$ is the experimentally-observed phase gap (Eq. (14)). Here again, all of the values with the exception of n and $k_0$ are expected to have an x, y field dependence related to optical distortions such as chromatic and spherical aberrations. There may also be a dependence on the tip and tilt of the part, which if it is substantial, will have to be recorded and used in the remaining calculations in much the same way as the x, y field dependence.

Part PCOR values $\gamma_{part}$ can be calculated from well-established physics principles governing reflection from an interface (e.g., the Fresnel equations) and tabulated values for the complex refractive index n+ik of the part material. The part PCOR dispersion value $\tau_{part}$ can be determined in a manner similar to the system characterization using the experimentally observed phase gap $G_{ex}"(x)$ and known values for $\gamma_{part}$ and $\tau_{sys}$:

$$k_0 \tau_{part} = <(\gamma(x) - G_{ex}"(x)) - k_0 \tau_{sys}(x)> \quad (43)$$

For most pure materials, we expect the height offset $\tau_{part}/2n$ to be of the same order of magnitude as $\gamma_{part}/2nk_0$ and to have the same sign. An alternative method for determining $\tau_{part}$ is to calculate the dispersion of calculated PCOR values using tabulated values of n+ik as a function of wavelength.

In addition to correcting for errors, the phase gap may be used to identify physical features. For example, surface features such as surface roughness manifest themselves in the phase gap typically appearing as scatter in the phase gap. Therefore, another embodiment of the invention is a method for measuring surface roughness based on a phase gap map derived from coherence and phase profiles. In one particular embodiment, the phase gap variance define by Eq. (35) provides a surface roughness map, which can be output to the user.

The data processing procedures described above can be applied to a large range of interferometry systems and particularly, to any height scanning interferometers. For example, the light source in the interferometer may be any of: an incandescent source, such as a halogen bulb or metal halide lamp, with or without spectral bandpass filters; a broadband laser diode; a light-emitting diode; a combination of several light sources of the same or different types; an arc lamp; any source in the visible spectral region; any source in the IR spectral region, particularly for viewing rough surfaces & applying phase profiling; any source in the UV spectral region, particularly for enhanced lateral resolution; and any source or combination of sources having a net spectral bandwidth broader than 0.1% of the mean wavelength. Furthermore, the scanning system may be: driven by any of a piezo-electric device, a stepper motor, and a voice coil; implemented opto-mechanically or opto-electronically rather than by pure translation (e.g., by using any of liquid crystals, electro-optic effects, strained fibers, and rotating waveplates); any of a driver with a flexure mount and any driver with a mechanical stage, e.g. roller bearings or air bearings. Also, the interferometer optics may form any of: an interferometric microscope employing, e.g., a Mirau or Michelson objective lens; a Twyman Green system; a Fizeau interferometer employing a filtered or structured source spectrum so as to provide coherence peaks far from zero OPD; a fiber interferometer; and a Mach Zehnder, particularly for profiling transparent media. Finally, the data analysis may involve any of: frequency domain analysis (FDA); peak-fringe analysis; dynamic filtering to extract the fringe visibility in real time; a least-squares technique to extract fringe visibility and phase at the same time; and fringe visibility analysis followed by phase analysis, potentially including a separate measurement for phase with a modified source spectrum.

The analysis steps described above can be implemented in computer programs using standard programming techniques. Such programs are designed to execute on programmable computers each comprising an electronic processor, a data storage system (including memory and/or storage elements), at least one input device, and least one output device, such as a display or printer. The program code is applied to input data (e.g., images from the camera) to perform the functions described herein and generate output information (e.g., surface profiles), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis described herein.

Other aspects, advantages, and modifications are within the scope of the following claims.

What is claimed is:

1. An analysis method for analyzing height-scanning interferometry data from a test surface, the method comprising:

calculating a coherence profile and a phase profile for the test surface based on the data;

calculating an experimental phase gap map based on a difference between the phase profile and the coherence profile;

filtering the experimental phase gap map to remove noise; and using the filtered phase gap map to determine a height profile of the test surface.

2. The method of claim 1, wherein the data comprises an intensity signal $I(\zeta,x)$ produced by interfering a measurement wavefront reflected from the test surface with a reference wavefront reflected from a reference surface, where the wavefronts are derived from a common source, $\zeta$ is a scan position for the reference surface, and x is a field position corresponding to an object position on the test surface.

3. The method of claim 2, wherein the coherence profile is calculated from a localization of interference fringes in the intensity signal with respect to the scan position $\zeta$.

4. The method of claim 2, wherein the coherence profile is calculated from a wavevector dependence of a phase $\phi$ of a transform of $I(\zeta,x)$ with respect to the scan position $\zeta$.

5. The method of claim 4, wherein the transform is a Fourier transform.

6. The method of claim 2, wherein the phase profile is calculated from an interferometric phase of $I(\zeta,x)$ at a nominal wavevector $k_0$.

7. The method of claim 6, where in the phase profile is calculated from a phase of a transform of $I(\zeta,x)$ with respect to the scan position $\zeta$ at a nominal wavevector $k_0$.

8. The method of claim 7, wherein the transform is a Fourier transform.

9. The method of claim 1, wherein the experimental phase gap map is calculated by expressing the coherence profile and the phase profile in common units.

10. The method of claim 9, wherein the coherence profile is expressed in radians with respect to a nominal wavevector $k_0$ according to $\Theta(x) = k_0 h_C(x)$, where $h_C(x)$ is a surface height profile of the test surface derived from the coherence profile, and wherein the phase profile is calculated as the interferometric phase $\theta(x)$ in radians of the height scanning interferometry data at the nominal wavevector $k_0$.

11. The method of claim 10, wherein the experimental phase gap map $G_{ex}(x)$ equals $\theta(x)-\Theta(x)$.

12. The method of claim 11, wherein a difference between the experimental phase gap map $G_{ex}(x)$ and a theoretical phase gap map $G(x)=\gamma(x)-k_0\tau(x)$ is indicative of agreement between the coherence profile of the test surface and the phase profile of the test surface, wherein $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector.

13. The method of claim 12, further comprising determining values for $\gamma(x)$ and $\tau(x)$.

14. The method of claim 1, wherein filtering the experimental phase gap map comprises calculating a global average of the experimental phase gap map.

15. The method of claim 14, wherein calculating the global average comprises calculating at least one trigonometric function for each of multiple points of the experimental phase gap map, averaging the results of each trigonometric function, and calculating an inverse trigonometric function based on each trigonometric average to determine the global average of the experimental phase gap map.

16. The method of claim 15, wherein calculating the at least one trigonometric function for the multiple points comprises calculating a sine map and a cosine map based on the experimental phase gap map, and wherein the inverse trigonometric function is based on an arctan 2 function.

17. The method of claim 1, wherein filtering the experimental phase gap map comprises calculating at least one trigonometric function for each of multiple points of the experimental phase gap map, smoothing the results of each trigonometric function over the multiple points, and calculating an inverse trigonometric function of the smoothed results to determine the filtered phase gap map.

18. The method of claim 17, wherein calculating the at least one trigonometric function for the multiple points comprises calculating a sine map and a cosine map based on the experimental phase gap map, and wherein the inverse trigonometric function is based on an arctan 2 function.

19. The method of claim 17, wherein smoothing the results of each trigonometric functions comprises using a convolution function.

20. The method of claim 17, wherein smoothing the results of each trigonometric functions comprises averaging the results among adjacent points.

21. The method of claim 1, wherein calculating the experimental phase gap map comprises smoothing the coherence profile to round edges in the coherence profile, and calculating the experimental phase gap map based on a difference between the phase profile and the smoothed coherence profile.

22. The method of claim 1, wherein filtering the experimental phase gap map comprises smoothing the coherence profile to round edges in the coherence profile, and determining the filtered phase gap map based on a difference between the phase profile and the smoothed coherence profile.

23. The method of claim 1, wherein filtering the experimental phase gap map comprises calculating a variance map of the experimental phase gap, filtering the experimental phase gap map with each of multiple algorithms, and calculating the filtered phase gap map based on a locally weighted average of the algorithm outputs, wherein the local weights are based on the variance map.

24. The method of claim 23, wherein calculating the variance map comprises calculating at least one trigonometric function for each of multiple points of the experimental phase gap map, smoothing the results of each trigonometric function over the multiple points, and determining the variance map based on the smoothed trigonometric functions.

25. The method of claim 1, wherein using the filtered phase gap map comprises connecting the filtered phase gap map to remove $2\pi$ phase steps.

26. The method of claim 25, wherein the using the filtered phase gap map further comprises fitting the connected filtered phase gap map to a polynomial function and using the polynomial function to improve an estimate for a height profile of the test surface.

27. The method of claim 25, wherein using the filtered phase gap map further comprises determining a relative fringe order profile by determining a multiple of $2\pi$ nearest to a difference between the experimental phase gap map and the connected filtered phase gap map.

28. The method of claim 27, wherein using the filtered phase gap map further comprises determining a relative height profile of the test surface based on the phase profile and the relative fringe order.

29. The method of claim 25, wherein using the filtered phase gap map further comprises determining an absolute fringe order based on the experimental phase gap map, the connected filtered phase gap map, and a theoretical phase gap map $G(x)=\gamma(x)-k_0\tau(x)$, where the phase profile is calculated with respect to a nominal wavevector $k_0$, $\gamma(x)$ is a value of a phase offset at the nominal wavevector $k_0$ produced by reflections from the test surface and elements of the interferometer used to measure the interferometry data, and $\tau(x)$ is a value of linear dispersion in the phase offset with respect to wavevector.

30. The method of claim 29, further comprising determining values for $\gamma(x)$ and $\tau(x)$.

31. The method of claim 29, wherein using the filtered phase gap map further comprises determining an absolute height profile of the test surface based on the phase profile and the absolute fringe order.

32. An interferometric analysis method comprising:
providing a coherence profile and a phase profile derived from height-scanning interferometry data for a test surface;
calculating a filtered phase gap map based on a difference between the phase profile and the coherence profile; and
using the filtered phase gap map to determine a height profile of the test surface.

33. The method of claim 32, wherein calculating the filtered phase gap map comprises smoothing the coherence profile to round edges in the coherence profile, and calculating the filtered phase gap map based on a difference between the phase profile and the smoothed coherence profile.

34. An interferometric analysis method for measuring surface roughness based on height-scanning interferometry data for a test surface, the method comprising:
calculating a coherence profile and a phase profile for the test surface based on the data;
calculating an experimental phase gap map based on a difference between the phase profile and the coherence profile; and
determining a surface roughness profile based on the experimental phase gap map.

35. The method of claim 34, wherein determining the surface roughness profile comprises calculating a variance map of the experimental phase gap map and determining the surface roughness profile based on the variance map.

36. The method of claim 35, wherein calculating the variance map comprises calculating at least one trigonometric function for each of multiple points of the experimental phase gap map, smoothing the results of each trigonometric function over the multiple points, and determining the variance map based on the smoothed trigonometric functions.

37. An interferometry system comprising:

a height-scanning interferometer which during operation measures height-scanning interferometry data for a test surface; and an electronic processor coupled to the height-scanning interferometer, wherein during operation the electronic processor: calculates a coherence profile and a phase profile for the test surface based on the data; calculates an experimental phase gap map based on a difference between the phase profile and the coherence profile; filters the experimental phase gap map to remove noise; and uses the filtered phase gap map to determine a height profile of the test surface.

38. An interferometry system comprising:

a height-scanning interferometer which during operation measures height-scanning interferometry data for a test surface; and an electronic processor coupled to the height-scanning interferometer, wherein during operation the electronic processor: calculates a coherence profile and a phase profile for the test surface based on the data; calculates a filtered phase gap map based on a difference between the phase profile and the coherence profile; and uses the filtered phase gap map to determine a height profile of the test surface.

39. An interferometry system comprising:

a height-scanning interferometer which during operation measures height-scanning interferometry data for a test surface; and an electronic processor coupled to the height-scanning interferometer, during operation the electronic processor: calculates a coherence profile and a phase profile based on the data; calculates an experimental phase gap map based on a difference between the phase profile and the coherence profile; and determines a surface roughness profile based on the experimental phase gap map.

40. A computer readable medium comprising a program that causes a processor to perform the steps of claim 1.

41. A computer readable medium comprising a program that causes a processor to perform the steps of claim 32.

42. A computer readable medium comprising a program that causes a processor to perform the steps of claim 34.

* * * * *

UNITED STATES PATENT AND TRADEMARK OFFICE
CERTIFICATE OF CORRECTION

PATENT NO.   : 6,775,006 B2
DATED        : August 10, 2004
INVENTOR(S)  : Peter De Groot and James W. Kramer It is certified that error appears in the above-identified patent and that said Letters Patent is hereby corrected as shown below:

Title page,
Item [56], References Cited, U.S. PATENT DOCUMENTS, insert -- 6,185,315 2/2001 Schmucker et al. --.
OTHER PUBLICATIONS, "M.-C Park reference", replace "polynominal" with -- polynomial --.

Column 16,
Line 53, replace "where in" with -- wherein --.

Column 17,
Lines 28 and 40, replace "arctan 2" with -- arctan2 --.

Signed and Sealed this

Thirtieth Day of August, 2005

JON W. DUDAS
*Director of the United States Patent and Trademark Office*